May 19, 1964 J. BULK ETAL 3,133,774

COUPLING MEMBER FOR CONNECTING COMPONENT LEAD
TO A PRINTED CIRCUIT BOARD
Filed April 22, 1960

INVENTORS
JAN BULK
LEON P. WEENINK
BY
Frank R. Trifari
AGENT

United States Patent Office 3,133,774
Patented May 19, 1964

3,133,774

COUPLING MEMBER FOR CONNECTING COMPONENT LEAD TO A PRINTED CIRCUIT BOARD

Jan Bulk and Leon Pieter Weenink, Eindhoven, Netherlands, assignors to North American Philips Company, Inc., New York, N.Y., a corporation of Delaware Filed Apr. 22, 1960, Ser. No. 23,951
Claims priority, application Netherlands May 1, 1959
2 Claims. (Cl. 339—17)

Figure 1:
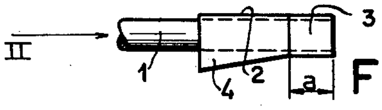

This invention relates to a coupling member for connecting a thin metal wire, which may be subdivided or stranded wire, to another component having an aperture in which the metal wire must be secured, and in particular to a coupling member for connecting a wire end of an electrical component, such as a capacitor, a resistor, and so on, to a mounting plate which is made of insulating material and is provided with printed wiring. A coupling member made of sheet metal and split longitudinally, is known. However, the manufacture of such a known coupling member is comparatively expensive, since the material from which this known coupling member is made, must be shaped by means of a complicated press tool, after which the shaped strip must be bent about the wire end by means of a likewise complicated machine.

The coupling member in accordance with the invention can be cheaply manufactured and does not have the other disadvantages of the known coupling member. According to the invention, the coupling member is preferably characterized in that it comprises a preferably cylindrical portion adapted to encircle the wire tightly, an adjacent part of the coupling member having a cross-sectional area constituted by a segment of a circle and two tangents thereto which bound a gap which progressively widens from the part tightly encircling the wire towards the end of the coupling member.

In an embodiment of the invention, the coupling member is made from a rectangular blank of sheet metal. This enables the coupling member to be made from a flat metal strip of constant cross-section without wastage of material. In order to ensure that the coupling member is readily grippingly secured in the aperture into which it is inserted in operation, in one embodiment of the invention the coupling member is made of resilient material, preferably of tin-plated hard brass.

The invention also relates to a mounting plate provided with printed wiring and with apertures and with at least one component mounted on the plate and having leads arranged in the apertures, which mounting plate in accordance with the invention is characterized in that the leads are each provided with a coupling member of the above-described kind the circumscribed circle of the cylindrical portion being smaller than the inscribed circle of the aperture, whereas at least at the other end of the coupling member, the circumscribed circle is greater than the said inscribed circle. This ensures that the coupling members, once they have been firmly inserted in the apertures, are tightly secured therein so that the components cannot drop from the mounting plate during transport, for example to a soldering bath. Hence it is of advantage if, in a further embodiment of the invention, the material of the coupling member is harder than the material of the mounting plate, so that the projecting jaws of the coupling members can penetrate into the material of the mounting plate and take a firm hold thereof.

The invention further relates to an apparatus for manufacturing the said coupling member and applying it to a wire, which apparatus according to the invention is characterized in that it has a preferably horizontal aperture in which the wire fits, and a pressing and cutting punch arranged on one side of the wire, which punch is adapted to move at right angles to the direction of length of the wire and is provided with a V-shaped recess which at the vertex of the V terminates in a narrow groove with rounded end, while at the other side of the wire and slightly spaced therefrom is arranged a stationary anvil having an upper surface, part of which extends parallel to the wire while another part is at an acute angle thereto, the part extending parallel to the wire being provided with a cavity, whilst the thickness of the anvil in the direction of the wire is equal to the thickness of the pressing and cutting punch and the apparatus is further provided with a rectangular slot extending parallel to the wire and above this wire, the dimensions of this slot being equal to the dimensions of the strip from which the coupling member is made, the bottom of the slot being about flush with the lower surface of the pressing and cutting punch.

Figure 2:
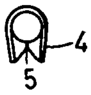
Figure 3:
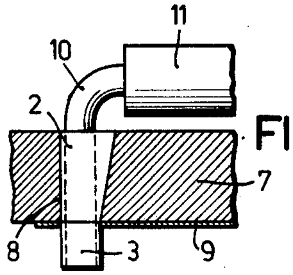
Figure 4:
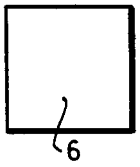
Figure 5:
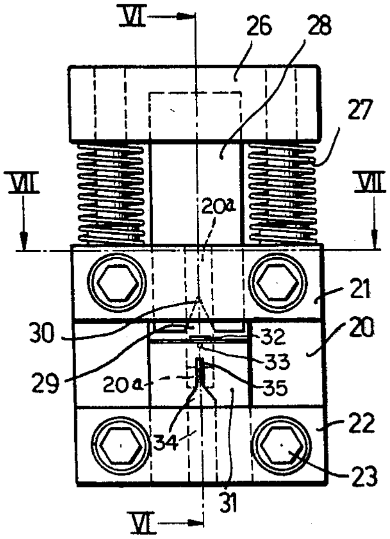
Figure 6:
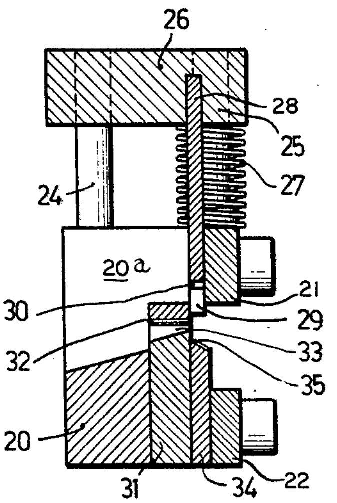
Figure 7:
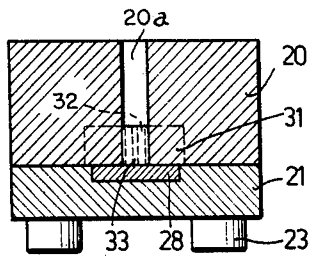

The invention will now be described more fully with reference to a drawing which shows embodiments of the invention, given by way of example, and in which FIG. 1 is an elevation of a coupling member, FIG. 2 is an elevation of the coupling member of FIG. 1 viewed in the direction of the arrow II, FIG. 3 is a sectional view of a mounting plate which is provided with printed wiring and to which a component is connected by means of a coupling member, FIG. 4 is a developed view of the coupling member of FIG. 1, FIG. 5 is a front elevation of an apparatus for manufacturing a coupling member and applying it to a wire, FIG. 6 is a sectional view of the apparatus of FIG. 5 taken along a line VI—VI and viewed in the direction of the arrow, and FIG. 7 is a cross-sectional view of the apparatus of FIG. 5 taken along a line VII—VII and also viewed in the direction of the arrow.

In FIG. 1, reference numeral 1 denotes a solid copper wire provided with a coupling member 2. This coupling member has a cylindrical portion 3 which is pressed round the wire through a distance *a*. The remaining portion of the coupling member has two jaws 4 which diverge from the end of the cylindrical portion so that they bound a widening gap 5. The material of the coupling member is hard tinned brass and, as is shown in FIG. 4, the development of the member is a rectangle 6, so that the coupling members can be made from flat strip material of constant cross-section without wastage.

In FIG. 3, reference numeral 7 denotes a mounting plate provided with an aperture 8 and, on one surface, with printed wiring 9. A coupling member 2 secured to a lead 10 of a resistor 11 is arranged in the aperture 8. The coupling member 2 is pressed into the aperture 8 and since the material of the mounting plate 7 is hard paper, which is softer than the material of the coupling member, the jaws 4 grip the mounting plate so that the resistor 11 is firmly secured to the plate 7. The cylindrical end of the coupling member 2 can be satisfactorily connected electrically to the printed wiring 9 by a simple soldering operation. Since the material of the coupling member is slightly resilient, the coupling member will be firmly secured in the aperture by the spring action of the upper portion also. The upper surface of the coupling member is flush with the upper surface of the mounting plate, so that the components can be secured thereto in closest proximity. In certain cases, the coupling member may be made longer so that it slightly protrudes from the plate with the result that in further mounting operations the wire is less likely to be injured by mechanical loads.

It will be appreciated that the aperture 8 need not be circular; it may have another shape, for example a rectangular shape. The only thing necessary is that the dimensions of the portion 3 of the coupling member is at most equal to the dimensions of the aperture 8, and that the dimensions of the other end of the coupling member is greater than the dimensions of the aperture.

The following is a description of an apparatus as shown in FIGS. 5, 6 and 7, by means of which the coupling members shown in FIG. 1 are made and pressed around the wire. The apparatus comprises a block 20 having a grooved opening 20*a* and to which two cross pieces 21 and 22 are secured by screws 23. Two studs 24 and two studs 25 are rigidly secured to the block 20. A pressure member 26, which is adapted to slide over these studs, is held raised by springs 27. A cutting and blending punch 28 is attached to the pressure member 26. This punch 28 has a V-shaped recess 29 in its lower surface, a small depression 30 being provided in the vertex of the V. The block 20 further contains a member 31 provided with a rectangular aperture 32 and a circular aperture 33 which widens downwardly towards the rear as illustrated in FIGS. 6 and 7. Finally provision is made of a lower die 34 having a cavity 35 in its upper surface, part of this cavity extending at right angles to the member 31 while the remaniing part slopes down towards the front.

If, now, the wire 1 must be provided with a coupling member 2, the wire is inserted into the aperture 33 at the front side, while a strip of material is placed in the gap 32 from the rear. Then the pressure member 26 is lowered so that a rectangular piece of the strip is pressed downwards. On further downward movement of the pressure member, this piece is bent about the wire end and pressed to surround this wire above the level part of the cavity 35. The part of the strip arranged above the inclined part of the lower die 34 is bent over, but not pressed around the wire. If, now, the pressure on the pressure member 26 is released, this member moves up again so that the wire and a coupling member of the kind shown in FIG. 1 tightly encircling it can be removed from the apparatus.

It is not necessary for the wire to have a circular cross-section; wires with quadratic or other cross-sections can also be provided with coupling members in the apparatus. In a manner known in the art, abutments can be provided both for the strip of material and for the wire. Obviously, the feed of both the material and the wire may be made entirely automatic.

Neither is it necessary for the wire to be solid; composite wire, for example stranded wire and the like, can also be provided with coupling members with or without the use of the apparatus described.

As a further alternative, such coupling members may be arranged not at the wire ends, but spaced therefrom by a desired distance; this may be desirable when the wire must protrude from the aperture.

What is claimed is:

1. A coupling member for connecting component leads to a printed circuit board, said coupling member comprising a cylindrical portion at one end of said member receiving the end of a component lead wire and pinched about said wire for connecting said member and said wire, and an adjoining portion extending coaxially from said cylindrical portion having a cross section comprising a segment of a circle engaging said lead wire and a pair of progressively enlarging wedge-shaped tangents extending from said segment of a circle, the gap bounded by the said tangents widening progressively from the cylindrical portion of said member toward the end of said member from which said lead wire extends, the material of said member and the edges of said tangents bounding said gap being adapted to cut into a printed circuit board whereby the portion of said member defining the segment of a circle and associated tangents grips said lead wire.

2. The combination comprising an apertured printed circuit board, at least one electric component mounted on said board and a coupling member secured to the lead wires of said component and securing said component on said board, said coupling member comprising a cylindrical portion at one end of said member receiving the end of a component lead wire and pinched about said wire for connecting said member and said wire, and an adjoining portion extending coaxially from said cylindrical portion having a cross section comprising a segment of a circle having an axis co-extensive with the axis of said cylindrical portion engaging said lead wire, and a pair of progressively enlarging wedge-shaped tangents extending from said segment of a circle, the gap bounded by the said tangents widening progressively from the cylindrical portion of said member toward the end of said member from which said lead wire extends, said tangents being embedded in said circuit board for securing said component thereto and said segment of a circle and the associated tangents gripping said lead wire upon insertion of said coupling member into an aperture of said board.

References Cited in the file of this patent

UNITED STATES PATENTS

| | | |
|---|---|---|
| 2,217,486 | Larson | Oct. 8, 1940 |
| 2,523,001 | Lamater | Sept. 19, 1950 |
| 2,535,674 | Franklin | Dec. 26, 1950 |
| 2,593,479 | Nieter | Apr. 22, 1952 |
| 2,701,869 | Hobson | Feb. 8, 1955 |
| 2,871,551 | Harris | Feb. 3, 1959 |
| 2,892,178 | Harris | June 23, 1959 |
| 2,072,880 | Olsson | Jan. 8, 1963 |

FOREIGN PATENTS

| | | |
|---|---|---|
| 576,589 | Great Britain | Apr. 11, 1946 |